(12) United States Patent
Floyd et al.

(10) Patent No.: US 6,587,963 B1
(45) Date of Patent: Jul. 1, 2003

(54) METHOD FOR PERFORMING HIERARCHICAL HANG DETECTION IN A COMPUTER SYSTEM

(75) Inventors: Michael Stephen Floyd, Leander, TX (US); Kevin F. Reick, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/569,547

(22) Filed: May 12, 2000

(51) Int. Cl.[7] .................................................. H02H 3/05
(52) U.S. Cl. .............................................. 714/25; 714/48
(58) Field of Search ........................... 714/25, 39, 47, 714/718, 48; 710/108, 24, 240, 244; 711/152

(56) References Cited

U.S. PATENT DOCUMENTS

| | | | | |
|---|---|---|---|---|
| 4,494,193 A | * | 1/1985 | Brahm et al. | 709/225 |
| 4,937,733 A | * | 6/1990 | Gillett et al. | 710/108 |
| 5,016,167 A | * | 5/1991 | Nguyen et al. | 711/151 |
| 5,025,370 A | * | 6/1991 | Koegel et al. | 710/241 |
| 5,133,074 A | * | 7/1992 | Chou | 711/146 |
| 5,761,454 A | * | 6/1998 | Adusumilli et al. | 710/311 |
| 6,073,182 A | * | 6/2000 | Jones et al. | 709/253 |
| 6,151,655 A | * | 11/2000 | Jones et al. | 710/244 |

* cited by examiner

*Primary Examiner*—Dieu-Minh Le
(74) *Attorney, Agent, or Firm*—Casimer K. Salys; Bracewell & Patterson, L.L.P.

(57) ABSTRACT

A method of detecting a hang in a computer system, by generating a plurality of hang strobe signals, detecting that a hang has occurred in the computer system using the hang strobe signals, and determining whether the hang occurred in the processing unit or in the memory subsystem. The intervals of the hang strobe signals may be programmably set. The first hang strobe signal (for the processing unit) preferably has an interval that is longer than the second hang strobe signal (for the memory subsystem). More than two strobe signals may be provided, e.g., for additional access layers of the memory subsystem. Hang detection may be accomplished in part by calculating a number of hang pulses that have issued during pendency of a processor instruction, and then selectively comparing the number to one of two hang limit values respectively associated with the processing unit and the memory subsystem. This selection may be based on a signal indicating whether any requests are still pending in the memory subsystem. The hang limit values can also be programmably set.

20 Claims, 5 Drawing Sheets

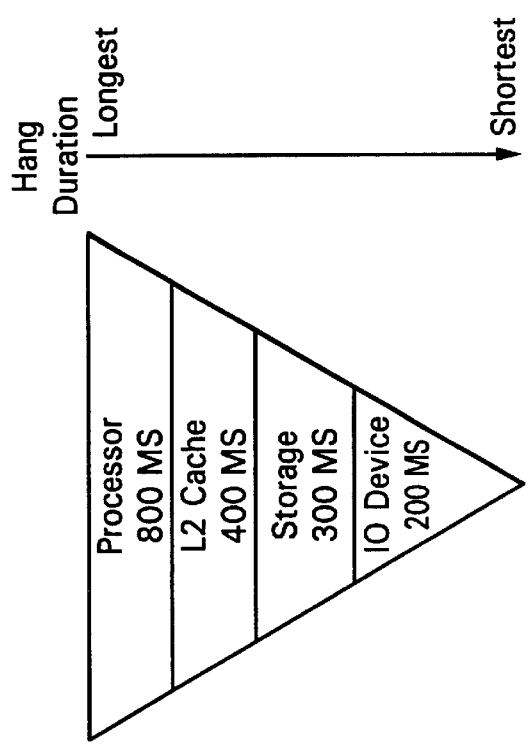
Fig. 2
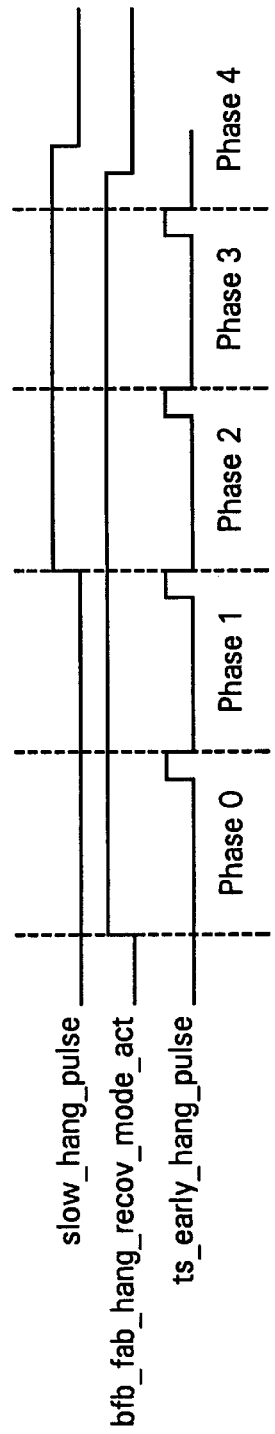
Fig. 4
Fig. 6

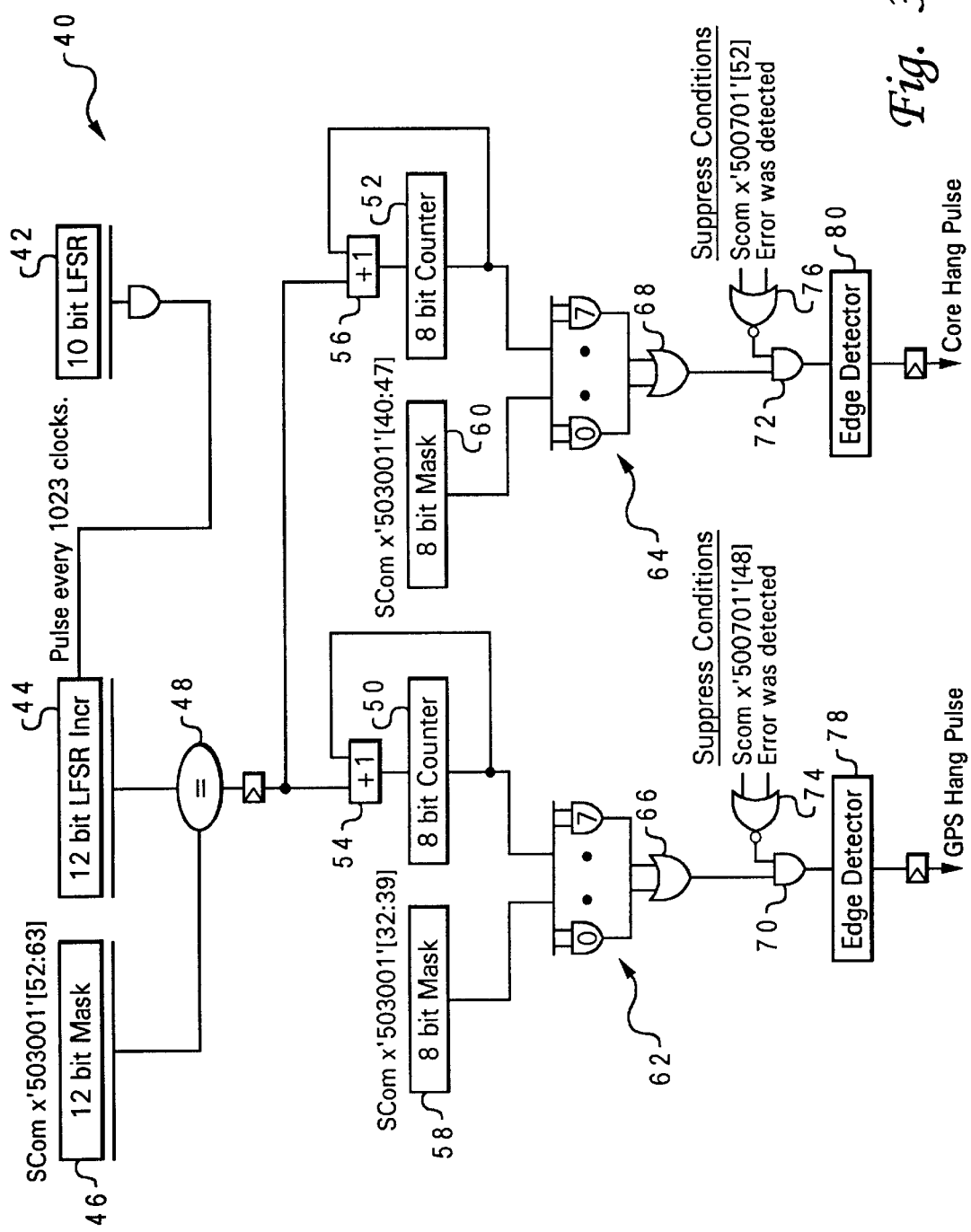

METHOD FOR PERFORMING HIERARCHICAL HANG DETECTION IN A COMPUTER SYSTEM

BACKGROUND OF THE INVENTION

1. Field of the Invention

The present invention generally relates to computer systems, and more particularly to a method of detecting which of a plurality of hardware devices in a computer system are failing, resulting in hanging of the computer system.

2. Description of Related Art

The basic structure of a conventional multi-processor computer system 10 is shown in FIG. 1. Computer system 10 has several processing units, two of which 12a and 12b are depicted, which are connected to various peripheral devices, including input/output (I/O) devices 14 (such as a display monitor, keyboard, and permanent storage device), memory device 16 (such as random access memory or RAM) that is used by the processing units to carry out program instructions, and firmware 18 whose primary purpose is to seek out and load an operating system from one of the peripherals (usually the permanent memory device) whenever the computer is first turned on. Processing units 12a and 12b communicate with the peripheral devices by various means, including a generalized interconnect or bus 20. Computer system 10 may have many additional components which are not shown, such as serial and parallel ports for connection to, e.g., modems or printers. Those skilled in the art will further appreciate that there are other components that might be used in conjunction with those shown in the block diagram of FIG. 1; for example, a display adapter might be used to control a video display monitor, a memory controller can be used to access memory 16, etc. The computer can also have more than two processing units.

A processing unit includes a processor core 22 having a plurality of registers and execution units, which carry out program instructions in order to operate the computer. An exemplary processing unit includes the PowerPC™ processor marketed by International Business Machines Corp. The processing unit can also have one or more caches, such as an instruction cache 24 and a data cache 26, which are implemented using high speed memory devices. Caches are commonly used to temporarily store values that might be repeatedly accessed by a processor, in order to speed up processing by avoiding the longer step of loading the values from memory 16. These caches are referred to as "on-board" when they are integrally packaged with the processor core on a single integrated chip 28. Each cache is associated with a cache controller (not shown) that manages the transfer of data between the processor core and the cache memory.

A processing unit can include additional caches, such as cache 32, which is referred to as a level 2 (L2) cache since it supports the on-board (level 1) caches 24 and 26. In other words, cache 32 acts as an intermediary between memory 16 and the on-board caches, and can store a much larger amount of information (instructions and data) than the on-board caches can, but at a longer access penalty. For example, cache 32 may be a chip having a storage capacity of 512 kilobytes, while the processor may be an IBM PowerPC™ 604-series processor having on-board caches with 64 kilobytes of total storage. Cache 32 is connected to bus 20, and all loading of information from memory 16 into processor core 22 must come through cache 32. Although FIG. 1 depicts only a two-level cache hierarchy, multi-level cache hierarchies can be provided where there are many levels (L3, L4, etc.) of serially connected caches.

As computer systems have become more complex, it has contemporaneously become more difficult to determine the cause of computer malfunctions, in spite of extensive factory testing. Some malfunctions are more serious than others. For example, if an error occurs when a value is read from or written to the system memory device, a parity checking technique with built-in error control is often able to automatically correct the error, and the computer may continue operation with practically no noticeable interruption. More serious errors may generate interrupt signals which can temporarily delay computer processing. These interrupts can require various components to be reset, or may call interrupt handlers, monitoring routines or debugging software in order to deal with, and possibly determine the cause of, the problem.

In the most serious cases, a hardware failure can cause a computer component to halt operation, a fault condition referred to as a "hang." When the component hangs, the entire computer system must usually be reset, that is, the power turned off and then back on again. This situation is not only inconvenient to users, but can further result in grievous loss of data, or crucial loss of control for an operation-critical system. These failures may arise either due to a soft error (a random, transient condition caused e.g., stray radiation or electrostatic discharge), or due to a hard error (a permanent condition, e.g., a defective transistor or interconnect line). One common cause of errors is a soft error resulting from alpha radiation emitted by the lead in the solder (C4) bumps used to form wire bonds with circuit leads.

It is accordingly important to be able to determine the true cause of a system failure (or as close as possible to the true cause) in order to address the problem and carry out appropriate repairs or replacement, as well as implement new engineering solutions for later manufacturing. However, in modern day systems having greater depth, when a computer access must go through several layers of devices to be serviced, it is often difficult or impossible to determine which component has caused the primary problem.

Consider for example a simple read operation. Referring to FIG. 1, a processor core such as 22 loads an instruction to retrieve (read) a particular data value (operand data) for further processing. In a problem-free system, when the processor executes the read operation, it passes the request down to data cache 26. If data cache 26 does not hold a valid copy of the requested value, then the request is passed to the L2 cache 32. If the value is also not present at L2 cache 32, then the request is passed down in a similar manner to lower levels of the memory hierarchy (if additional cache levels are present), until it is received by system memory 16. The value may not be in system memory, if it has temporarily been placed on a permanent storage device (hard disk drive, or HDD), e.g., in a "virtual memory" configuration. In such a case, the value must further be retrieved from the I/O device 14. Once the value is located, it is passed back up the memory hierarchy and loaded into processor core 22.

If any level in this access chain fails, then the entire system may hang. Under these circumstances, it is often unclear which component has actually caused the problem. It is sometimes necessary to have field diagnostics performed to determine the cause, which can be very expensive. Alternatively, several components might have to be replaced if the single failing component cannot be specifically identified. It would, therefore, be desirable to provide an improved method of indicating which component has caused a computer system to halt operation. It would be further advantageous if the method could allow a more accurate diagnostic call, or simplify debugging of the hang.

SUMMARY OF THE INVENTION

It is therefore one object of the present invention to provide an improved computer system.

It is another object of the present invention to provide an improved method of diagnosing operational problems in a computer system.

It is yet another object of the present invention to provide such a method which detects a primary component causing the computer system to hang.

The foregoing objects are achieved in a method of detecting a hang in a computer system, wherein the computer system includes a processing unit and a memory subsystem providing one or more access layers, generally comprising the steps of generating a plurality of hang strobe signals (including at least a first hang strobe signal for the processing unit, and a second hang strobe signal for the memory subsystem), detecting that a hang has occurred in the computer system using the hang strobe signals, and determining whether the hang occurred in the processing unit or in the memory subsystem. The intervals of the hang strobe signals may be programmably set or tuned to adjust the detection mechanism for the given system configuration. The hang strobe signals may have different intervals, and preferably the first hang strobe signal has an interval that is longer than an interval of the second hang strobe signal. More than two strobe signals may be provided, e.g., the generating step may further generate a third hang strobe signal for the memory subsystem, wherein the second and third hang strobe signals are applied to different access layers of the memory subsystem. The detecting step may be accomplished in part by calculating a number of hang pulses that have issued during pendency of a processor instruction, and then selectively comparing the number to either a first hang limit value associated with the processing unit, or a second hang limit value associated with the memory subsystem. This selection may be based on a signal indicating whether any requests are still pending in the memory subsystem. In one embodiment, the determining step also uses the signal indicating whether any requests are still pending in the memory subsystem. The hang limit values can also be programmably set.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

FIG. 2 is a pictorial representation of how hang intervals for various computer components are tuned according to one implementation of the present invention;

FIG. 3 is schematic diagram of one embodiment of a master strobe generator used by the present invention;

FIG. 4 is table of mask bit settings that may be used for the circuitry of FIG. 3;

FIG. 6 is a timing diagram showing the relative timing of the activation of various signals of the circuit of FIG. 5.

DESCRIPTION OF AN ILLUSTRATIVE EMBODIMENT

Figure 1:
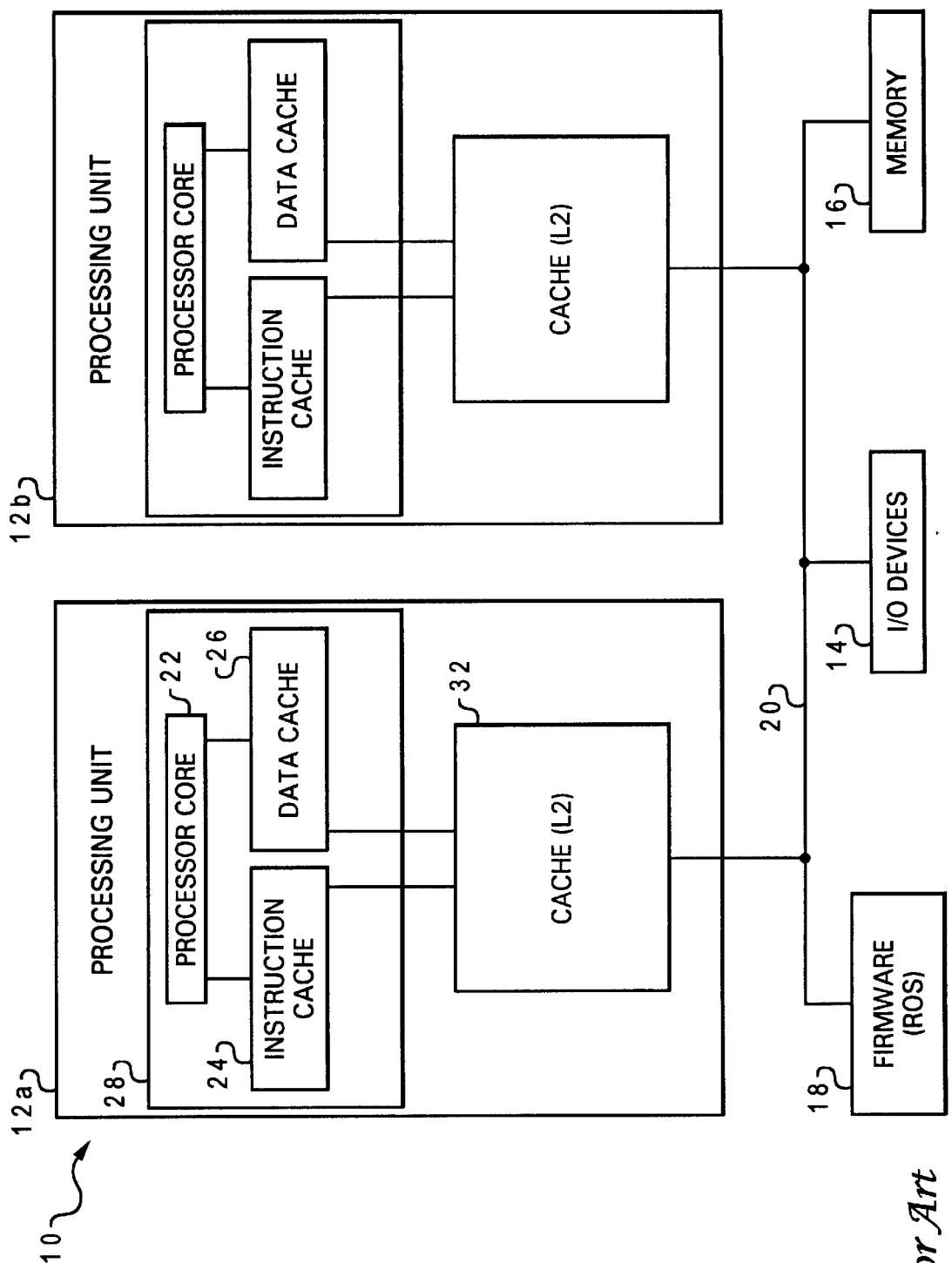
FIG. 1 is a block diagram of a prior art multiprocessor computer system.

The present invention is directed to a method for performing hierarchical hang detection in a computer system, such as the system of FIG. 1. The present invention could be applied to computer systems that have additional hardware components not shown in FIG. 1, or have a novel interconnection architecture for existing components. Therefore, those skilled in the art will appreciate that the present invention is not limited in application to the generalized system shown in that figure.

The present invention provides for hang detection in both the processing unit (processor core and on-chip caches) and the remainder of the memory hierarchy (including system memory and any I/O storage devices). Hang intervals are tuned such that components on the processor side have a longer time-out than components on the storage unit side that are processing te request. In this manner, the hang error is forced closer to the actual source of the hang, allowing for more accurate diagnostic calls, and making debugging of the hang easier.

As illustrated in FIG. 2, the hang interval can be viewed as an inverted triangle with the processor at the top, and the I/O devices at the bottom. Hang duration is thus set higher for the processor side, and lower for the I/O side. The following settings-are exemplary: processing unit, 800 ms; L2 cache, 400 ms; main memory 300 ms; and I/O device 200 ms. The duration of the hang detection is programmable and is preferably tuned (for each specific component) based on the particular latencies of the given system configuration. The duration for the memory subsystem may be set to an interval different from that for the processor core, and preferably the I/O side is always set to trip before the processor. As described in further detail below, the present invention may advantageously use a master hang strobe to determinate the hang duration. In addition, the hang interval for the L2 and lower (L3) caches, and the bus interface (to the I/O devices) may be adjusted even further at each of the units.

FIG. 3 illustrates a master hang strobe 40 used in one embodiment of the present invention to generate the hang duration. A free-running 10-bit linear feedback shift register (LFSR) incrementer 42 feeds into a 12-bit LFSR incrementer 44. LFSR 42 provides an output pulse every 1023 clock cycles. The output of incrementer 42 is combined with the output of a first mask (12-bit) 46 in a comparator 48. Mask 46 provides programmability for the primary (global) strobe signal. The output of comparator 48 is sent to two 8-bit counters 50, 52, via incrementers 54, 56. Each of the counters is applied, bitwise, with 8-bit masks 58 and 60 to respective gate arrays 62, 64. Each gate array has eight AND gates. The outputs of these gates are combined into two respective OR gates 66, 68. The bits in masks 58 and 60 are set according to the particular intervals desired for the core and the memory subsystem. These intervals may be powers of two as illustrated in FIG. 4.

The outputs of these two OR gates 66, 68 (which are generally active at different frequencies for the core and memory subsystem strobes) are further provided as separate inputs to two AND gates 70, 72. These AND gates separately receive second inputs from NOR gates 74, 76 which are used to suppress the strobes under certain conditions. These conditions may include, for example, periods of known system errors to prevent a secondary hang error (such as when a component toward the I/O side hangs first), or during service processor maintenance operations (which may include fault recovery) to prevent false hang detection. In both of these cases, the strobe suppress prevents false hang indications during fault recovery or, in the case of system check stops, prevents incorrect fault isolation diagnostics.

The outputs of AND gates 70, 72 are therefore appropriately synchronized, and are sent to respective edge detectors 78, 80 to generate the final strobe hang pulses.

Figure 5:
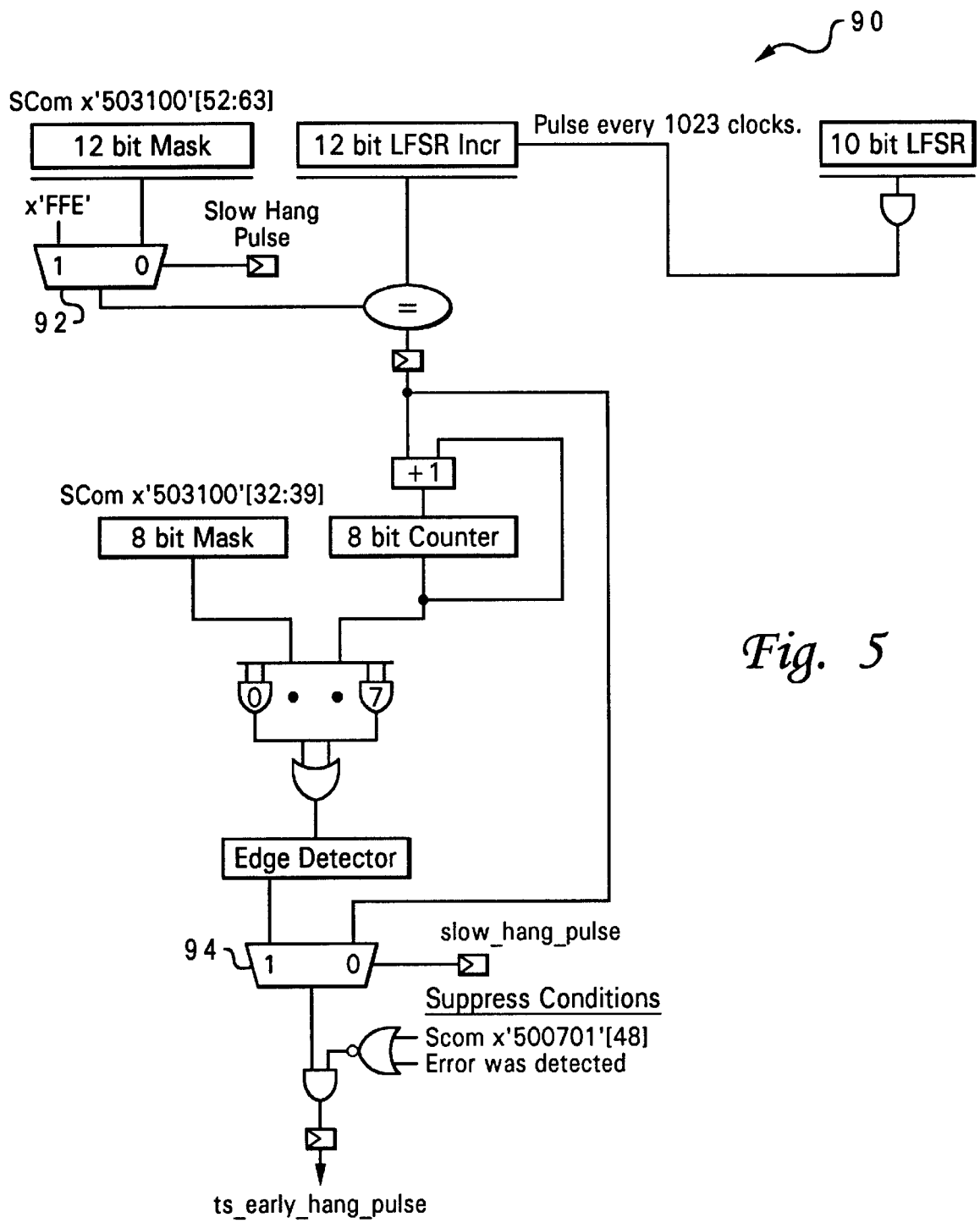
FIG. 5 is a schematic diagram of one embodiment of a strobe generator used for early hang detection of a computer's memory subsystem, according to the present invention.

FIG. 5 illustrates a circuit which may be used for hang pulse generation in order to provide for early hang detection of the memory subsystem. Early hang detection circuit 90 is very similar to master strobe generator 40, but early hang detection circuit 90 introduces a slow hang signal ("slow_hang_pulse"). The slow hang signal is provided as the select for two multiplexer's 92 and 94. The first mask (12-bit) is connected as a first input to multiplexer 92, which has a second input at a fixed value ("FFE" hexadecimal). When the slow hang signal is low (inactive), the strobe is set as normal, using the 12-bit mask. In this state, multiplexer 92 is used to circumvent the secondary stage of the circuit, having the 8-bit counter, 8-bit mask and gate array. When the slow hang signal is active, multiplexer 92 uses the fixed constant to determine the hang duration, and multiplexer 94 selects the signal from the gate array. This selection allows the longest duration between hang pulses to prevent false hang detection during automatic (hardware-implemented) hang recovery.

The 8-bit counters are reset whenever a hang recovery mode signal ("bfb_fab_hang_recov_mode_act") or the slow hang signal changes state. Programmable mode bits determine during which phase the slow_hang_pulse comes active. The hang recovery mode signed is thus used to throttle back hang pulses based on a recovery action.

The relative timing of these various signals is shown in the diagram of FIG. 6. During phase 0, the "bfb_fab_hang_recov_mode_act" signal is active, and the early hang pulse signal ("ts_early_hang_pulse") is inactive. At the end of this first time interval, the early hang pulse briefly becomes active. These settings are repeated during the next interval, phase 1. In Phase 2, the slow hang signal has become active, and the "bfb_fab_hang_recov_mode_act" signal remains active. At the end of this third interval, the early hang pulse again briefly becomes active, and these settings are likewise repeated during the fourth interval, phase 3. During phase 4, both the slow hang signal and the "bfb_fab_hang_recov_mode_act" signal become inactive. When "bfb_fab_hang_recov_mode_act" is inactive, this indicates that the recovery was successful, and the system can return to full speed hang detection.

Figure 7:
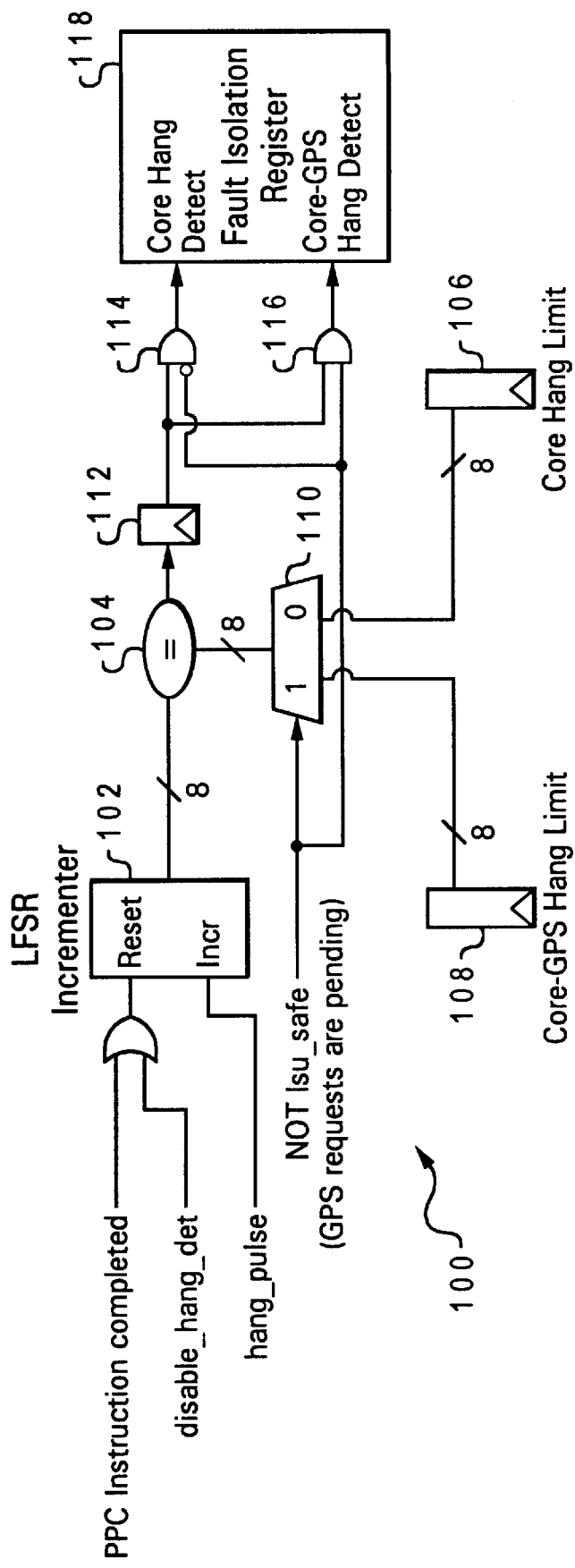
FIG. 7 is a schematic diagram of one embodiment of a hang detect circuit constructed in accordance with the present invention.

Additional hang detection logic is implemented locally in the processor cores. If a processor has not completed an instruction at the end of N hang pulses (where the number N is programmable), a hang checker is activated. One embodiment of a hang check circuit 100 is shown in FIG. 7. Hang checker 100 includes an LFSR incrementer 102 having two inputs. A first (reset) input is provided by OR gate 104 which further receives as its inputs a signal to indicate completion of the instruction (e.g., a PowerPC, or "PPC" instruction), and a signal "disable_hang_det" which may be used in a diagnostic, recovery or maintenance mode to disable hang detection. The second (incrementing) input is provided from the "hang_pulse" signal (from edge detector 80 of FIG. 3. In this manner, LFSR incrementer 102 generates a value which corresponds to the number of hang pulses that have occurred during the pendency of a given processor instruction.

This value is compared by comparator 104 to one of two hang limit values—either the hang limit value for the core, or the hang limit value for the memory subsystem. The hang limit for the core may be stored in a first register 106, and the hang limit for the remainder of the memory subsystem stored in a second register 108. A multiplexer 110 is used to pass on the appropriate hang limit value to comparator 104. The select line for multiplexer 110 is an indicator of whether processor core instruction execution is stalled due to the memory subsystem. This select line may be derived from suitable logic which indicates, e.g., that the core is waiting on an outstanding load instruction or translation table walks, that the store queue is full, that the memory bus is busy, etc. If the processor is not stalled due to the memory subsystem, then the core hang value from register 106 is used. If the processor is stalled due to the memory subsystem, then the subsystem value from register 108 is used. When comparator 104 finds a match, it turns on latch 112. The output of latch 112 is provided to as a first input to two AND gates 114 and 116. The memory subsystem request pending ("NOT lsu_safe") signal is applied as a second input to gate 116, and the inverted signal is applied as a second input to gate 114.

In this manner, gate 114 will turn on whenever the hang lies in the core, while gate 116 will turn on whenever the hang lies in the memory subsystem. These gates are coupled to a fault isolation register 118. The output of gate 114 connects to a core hang detect input of fault isolation register 118, while the output of gate 116 connects to a memory subsystem detect input. Depending upon which of these inputs was activated, fault isolation register 118 can be used to record the source of the fault, for later diagnostics, or repairs. Fault isolation register 118 can also be used to activate hang recovery logic, which is beyond the scope of the present invention.

While circuitry is shown for generating two strobe signals (one for the core and one for remaining memory subsystem), those skilled in the art will appreciate that similar circuitry may be used to provide synchronized signals of different intervals for other specific portions of the memory subsystem. For example, in the preferred embodiment, a strobe is provided for each lower level cache (L2, L3, etc.), as well as the system memory device, and further for the bus interface to the I/O storage device.

The present invention accordingly possesses several advantages over the prior art, particularly the ability to detect a hang when a computer access must go through several layers of devices to be serviced. The hang checking spans multiple clock domains and functions (I/O device access, memory access, instruction execution, etc.). This checking avoids false component call-outs for both more efficient lab debugging, and bad device field replaceable unit calls.

As previously noted, the hang delays are programmable, and the length of the longest store operation will guide how to program the hang duration registers. The values may be determined empirically in the lab for each different system configuration.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of detecting a hang in a computer system having a processing unit and a memory subsystem, said method comprising:

generating a first hang strobe signal and a second hang strobe signal, wherein said first hang strobe signal is associated with said processing unit, and said second hang strobe signal is associated with said memory subsystem;

maintaining a count of said first hang strobe signal and a count of said second hang strobe signal have lapsed since an initiation of a process;

resetting said count of said first hang strobe signal and said count of said second hang strobe signal in response to a completion of said process;

concluding a hang has occurred in said memory subsystem if said count of said second hang strobe signal has exceeded a predetermined hang limit for said memory subsystem; and concluding a hang has occurred in said processing unit if said count of said first hang strobe signal has exceeded a predetermined hang limit for said processing unit.

2. The method of claim 1, wherein said generating further includes programmably setting time intervals for said hang strobe signals.

3. The method of claim 1 further comprising selectively suppressing said hang strobe signals during system maintenance of said computer system.

4. The method of claim 1, wherein said generating further includes generating a third hang strobe signal for a specific access layer within said memory subsystem.

5. The method of claim 1, wherein said first and second hang strobe signals have different time intervals.

6. The method of claim 5, wherein said time interval of first hang strobe signal is longer than said time interval of said second hang strobe signal.

7. The method of claim 1, wherein said predetermined hang limit for said memory subsystem is less than said predetermined hang limit for said processor.

8. The method of claim 1, wherein said method further includes utilizing a first signal to indicate whether said process is still pending in said processor.

9. The method of claim 8, wherein said method further includes utilizing a second signal to indicate whether said process is still pending in said memory subsystem.

10. The method of claim 1, wherein said method further includes programmably setting said first and second hang limit values.

11. A computer system capable of detecting a hang, said computer system comprising:

generating a first hang strobe signal and a second hang strobe signal, wherein said first hang strobe signal is associated with said processing unit, and said second hang strobe signal is associated with said memory subsystem;

maintaining a count of said first hang strobe signal and a count of said second hang strobe signal have lapsed since an initiation of a process;

resetting said count of said first hang strobe signal and said count of said second hang strobe signal in response to a completion of said process;

concluding a hang has occurred in said memory subsystem if said count of said second hang strobe signal has exceeded a predetermined hang limit for said memory subsystem; and concluding a hang has occurred in said processing unit if said count of said first hang strobe signal has exceeded a predetermined hang limit for said processing unit.

12. The computer system of claim 11, wherein said generating means further includes means for programmably setting time intervals for said hang strobe signals.

13. The computer system of claim 11 further comprising means for selectively suppressing said hang strobe signals during system maintenance of said computer system.

14. The computer system of claim 11, wherein said generating means further includes generating a third hang strobe signal for a specific access layer within said memory subsystem.

15. The computer system of claim 11, wherein said first and second hang strobe signals have different time intervals.

16. The computer system of claim 15, wherein said time interval of first hang strobe signal is longer than said time interval of said second hang strobe signal.

17. The computer system of claim 11, wherein said predetermined hang limit for said memory subsystem is less than said predetermined hang limit for said processor.

18. The computer system of claim 11, wherein said computer system further includes means for utilizing a first signal to indicate whether said process is still pending in said processor.

19. The computer system of claim 18, wherein said computer system further includes means for utilizing a second signal to indicate whether said process is still pending in said memory subsystem.

20. The computer system of claim 11, wherein said computer system further includes means for programmably setting said first and second hang limit values.

* * * * *